United States Patent
Zinner

(10) Patent No.: US 11,038,912 B2
(45) Date of Patent: Jun. 15, 2021

(54) METHOD OF SELECTING THE MOST SECURE COMMUNICATION PATH

(71) Applicant: Continental Automotive GmbH, Hannover (DE)

(72) Inventor: Helge Zinner, Regensburg (DE)

(73) Assignee: Continental Automotive GmbH

(*) Notice: Subject to any disclaimer, the term of this patent is extended or adjusted under 35 U.S.C. 154(b) by 136 days.

(21) Appl. No.: 16/344,876

(22) PCT Filed: Nov. 13, 2017

(86) PCT No.: PCT/EP2017/079027
§ 371 (c)(1),
(2) Date: Apr. 25, 2019

(87) PCT Pub. No.: WO2018/091401
PCT Pub. Date: May 24, 2018

(65) Prior Publication Data
US 2019/0268368 A1   Aug. 29, 2019

(30) Foreign Application Priority Data
Nov. 18, 2016  (DE) .................... 10 2016 222 741.6

(51) Int. Cl.
*H04L 29/06* (2006.01)
*H04L 29/08* (2006.01)
*H04L 12/40* (2006.01)

(52) U.S. Cl.
CPC .......... *H04L 63/1433* (2013.01); *H04L 12/40* (2013.01); *H04L 63/20* (2013.01); *H04L 67/12* (2013.01); *H04L 69/14* (2013.01); *H04L 63/1458* (2013.01); *H04L 2012/40273* (2013.01); *H04L 2209/84* (2013.01)

(58) Field of Classification Search
CPC ............ G06F 21/577; H04L 12/40104; H04L 63/1433; H04L 63/1441–1483; H04L 63/20–205; H04L 67/12; H04L 69/14
See application file for complete search history.

(56) References Cited

U.S. PATENT DOCUMENTS

| 9,038,162 B2 | 5/2015 | Hagiu et al. |
| 2009/0007246 A1* | 1/2009 | Gutowski ............... H04L 63/20 726/6 |
| 2010/0100959 A1 | 4/2010 | Mahaffey |
| 2015/0150124 A1 | 5/2015 | Zhang et al. |

(Continued)

FOREIGN PATENT DOCUMENTS

| CN | 101937421 A | 1/2011 |
| EP | 1420317 A2 | 5/2004 |

(Continued)

OTHER PUBLICATIONS

German Search Report for German Application No. 10 2016 222 741.6, dated Jul. 24, 2017 with partial translation—10 pages.

(Continued)

*Primary Examiner* — Kevin Bechtel
(74) *Attorney, Agent, or Firm* — RatnerPrestia

(57) ABSTRACT

A method for a communication network in a motor vehicle, wherein data are transmitted in at least one communication path for communication in the communication network. Also disclosed is an electronic monitoring unit.

7 Claims, 5 Drawing Sheets

(56) References Cited

U.S. PATENT DOCUMENTS

| | | |
|---|---|---|
| 2015/0188935 A1 | 7/2015 | Vasseur et al. |
| 2015/0191135 A1 | 7/2015 | Noon et al. |
| 2015/0195297 A1 | 7/2015 | Noon et al. |
| 2015/0264554 A1 | 9/2015 | Addepalli et al. |
| 2015/0271201 A1 | 9/2015 | Ruvio et al. |
| 2016/0255154 A1 | 9/2016 | Kim et al. |

FOREIGN PATENT DOCUMENTS

| | | |
|---|---|---|
| JP | 2009508261 A | 2/2009 |
| JP | 2009071436 A | 4/2009 |
| JP | 2010010863 A | 1/2010 |

OTHER PUBLICATIONS

International Search Report and Written Opinion for International Application No. PCT/EP2017/079027, dated Feb. 22, 2018—8 pages.

Chinese Office Action for Chinese Application No. 201780066678.1, dated Dec. 17, 2020, 8 pages.

Japanese Decision of Refusal for Japanese Application No. 2019-526329, dated Aug. 28, 2020, with translation, 4 pages.

Korean Notice of Grounds for Rejection for Korean Application No. 10-2019-7014356, dated Aug. 24, 2020, with translation, 8 pages.

Matter et al., "Model-Based Security Evaluation of Vehicular Networking Architectures", 2010 Ninth International Conference on Networks, 2010, 9 pages.

Mansor et al., Can Bus Risk Analysis Revist, ICIAP International Conference on Image Analysis and Processing, 2013, pp. 170-179.

European Search Report for European Application No. 17804113.3, dated Mar. 25, 2021, 7 pages.

Liu et el., In-Vehicle Network Attacks and Countermeasures: Challenges and Futue Directions, IEEE Network, 2017, vol. 31, No. 5, 9 pages.

* cited by examiner

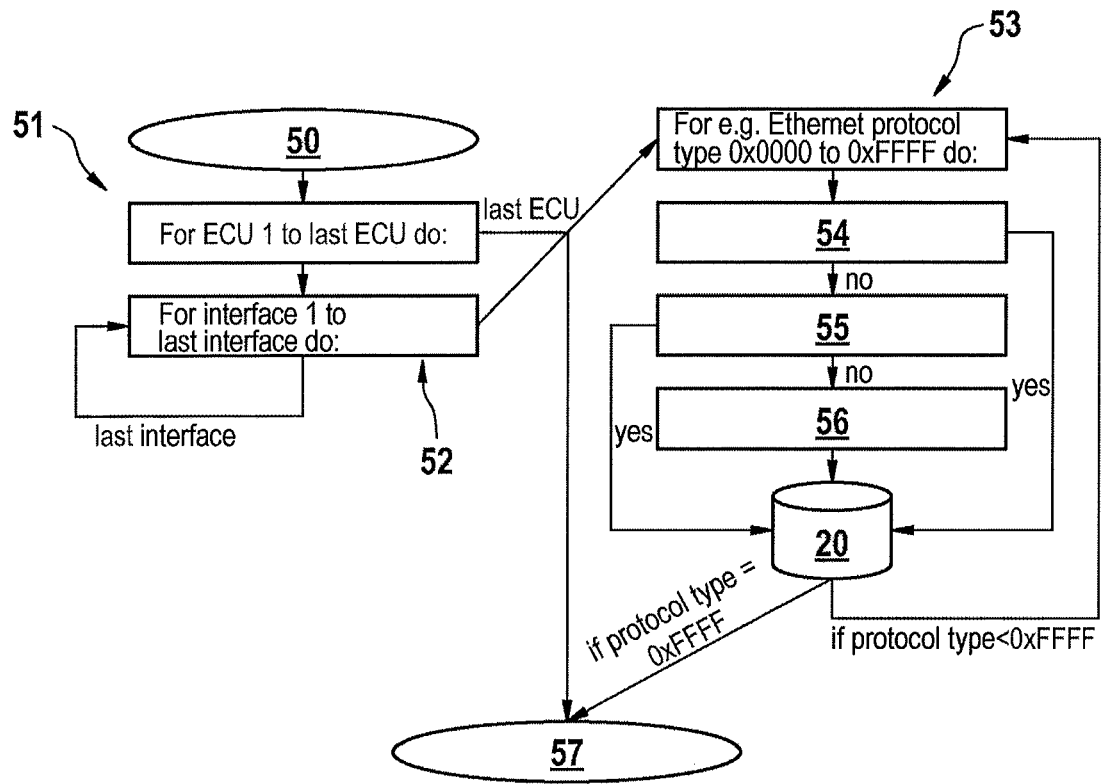

Fig. 6

Table 1: risk assessment of the protocols

| Protocol | Subprotocol | ECU | Status | Risk |
|---|---|---|---|---|
| Ethernet | 802.1AS | Gateway | Is explicitly passed to the application | Can overload the CPU in the case of flooding - switch on ingress filtering |
| | 1722 | Gateway | Is not passed to the CPU but rather explicitly to other interfaces | |
| | MMRP | Body-controller | Is not mentioned - falls under miscellaneous - is passed to the CPU for analysis | Can cause faults or DOS attacks on the CPU |
| | ARP | Gateway | Is explicitly passed to the CPU | Can overload the CPU in the case of flooding - switch on ingress filtering |
| | | | | |

Fig. 7

METHOD OF SELECTING THE MOST SECURE COMMUNICATION PATH

CROSS REFERENCE TO RELATED APPLICATIONS

This application is the U.S. National Phase Application of PCT International Application No. PCT/EP2017/079027, filed Nov. 13, 2017, which claims priority to German Patent Application No. 10 2016 222 741.6, filed Nov. 18, 2016, the contents of such applications being incorporated by reference herein.

FIELD OF THE INVENTION

The present invention relates to a method for a communication network and to an electronic monitoring unit.

BACKGROUND OF THE INVENTION

On the basis of the Ethernet physical layer and the Internet protocol (IP) above it, techniques which are already widespread within the scope of information technology systems are finding their way into communication networks of vehicles. With regard to an increasing use of the Ethernet and Internet protocols in particular, there is a need for further security mechanisms in order to be able to prevent external access. On account of increasing use of radio technologies and associated open and standardized protocols, it is therefore possible substantially for the first time in the automotive sector to access the communication networks of a vehicle by remote access. Access to vehicles, during which attackers have managed to gain access to a vehicle via radio and therefore to influence important vehicle functions, has been known, for example. Other industrial sectors have problems and solutions which cannot be applied to automobiles since, for example in the case of a workstation computer, a firewall already operates with data which are already present in the system and not on-the-fly, as required for vehicles. In addition, the security software of workstation computers can be updated in a considerably easier manner than software in automobiles.

A communication packet according to the prior art usually comprises headers of superordinate layers of a protocol stack of a transmitting device. A protocol stack of a receiving device will proceed gradually when receiving this communication packet and will examine it by means of predefined filters in order to forward the transmitted data to a corresponding software application, for example. A communication packet, such as an Ethernet message, runs through a TCP/IP stack, for example, in a control device and is forwarded to the corresponding application on the basis of the analysis of the content.

The complexity of protocol stacks increases considerably with the number of protocols used. For example, Audio/Video Bridging (AVB) for transmitting and reproducing audio and video data comprises four sub-protocols, and Time-Sensitive Networking (TSN) even comprises eleven sub-protocols and comprehensive specifications. The disadvantage of this is that there is thus no simple traceability for a deterministic protocol stack since, on account of the multiplicity of protocols used, there is a very large number of branching possibilities which cannot be easily represented. Therefore, there are considerable problems with determining existing security gaps in a protocol stack. The question is, for example, how to proceed if a new Ethernet type is intentionally or unintentionally used, which would be forwarded to the central computing unit in the case of doubt, which could cause a critical system state and could considerably restrict the functionality of an underlying system and could endanger the safety of road users. Such deliberate unauthorized access could take place using security gaps which have previously not been found by means of a denial-of-service attack (DoS) which deliberately searches for security gaps in a protocol stack.

SUMMARY OF THE INVENTION

An aspect of the invention is a method and an apparatus which can be used to make a vehicle network more secure with respect to external access.

An aspect of the invention proposes a method for a communication network in a motor vehicle, wherein data are transmitted in at least one communication path for communication in the communication network. The method according to an aspect of the invention comprises at least one step, preferably a plurality of steps. These steps relate to at least an assessment of the communication paths which are possible for transmitting data with respect to their risk of attack.

The risk of attack is the risk of the communication path being attacked for the purpose of using security gaps. In other words, this is the risk of the communication path becoming the victim of an attack (cyber attack/hacker attack) by a third party which, with its attack, gains access to information or control of control mechanisms/regulation mechanisms. In automobiles, such takeover of control by third parties may have an effect on the safety, in particular of the vehicle occupants, and should therefore be avoided. This can be achieved by means of an aspect of the invention.

In the context of an aspect of the invention, a communication path should be understood as meaning the fact that a path comprises a plurality of communication participants and a connection for transmitting data between the participants. A plurality of communication paths which are suitable for certain communication or for transmitting data or for different data transmissions may be present in the motor vehicle.

As a result of the determination of the risk of the available communication paths being attacked, gaps which could possibly be used by third parties for an attack can already be determined before the motor vehicle is delivered or started up. The gaps can therefore either be eliminated and/or reduced or connections between communication participants may be configured in such a manner that there is a low security risk of an attack.

According to one development of an aspect of the invention, at least one data transmission protocol is preferably provided for transmitting data in the communication path. According to the development, the data transmission protocols which are possible for transmitting data are likewise assessed with respect to their risk of attack.

In particular, the data transmission protocols are, for example, in the form of Ethernet, FlexRay, VLAN (Virtual Local Area Network), IP (Internet Protocol), AVB (Audio/Video Bridging), TSN (Time Sensitive Networking) or SOME/IP (Scalable service-Oriented MiddlewarE over IP). As a result of the additional assessment of the data transmission protocols, a broader database is available, with the result that better discovery of gaps and therefore better security with respect to attacks can be achieved.

In one preferred development, the steps of the method likewise relate to selecting a communication path and a data transmission protocol for transmitting data on the basis of the determined assessment of the associated risks of attack, and transmitting data using the selected communication path and the selected data transmission protocol. In this case, the transmission of data can be configured by means of the assessments of the risk of attack in such a manner that there is a low security risk of an attack on the network.

An aspect of the invention can advantageously increase the security of a vehicle network, in particular without additional financial outlay. With the use of Ethernet or other data transmission systems (for example FlexRay) in the automobile, there is a need, inter alia, for mechanisms which use simple techniques and given properties of technologies in order to be able to dispense with expensive implementations and further additional hardware. As a result of earlier detection of attacks and abnormal behavior by means of the early analysis of the communication paths, gaps and faults can be detected before the vehicle is delivered. The network system according to an aspect of the invention is improved in terms of costs and reliability. The ability to test the system is defined more clearly by an aspect of the invention and test costs can be saved as a result. An aspect of the invention also provides a transparent security functionality.

In one preferred development of an aspect of the invention, each communication path comprises a plurality of communication participants. In this case, the communication participants particularly preferably comprise at least a transmitter and a receiver between which communication is carried out in the form of a data transmission. According to this development, at least one of the communication participants, that is to say either the transmitter or the receiver, is part of the communication network in the automobile. This participant is preferably arranged in the automobile in this case. The respective other communication participant may either be likewise part of the communication network—and would then likewise be arranged in the automobile—or is an external participant which is thus externally positioned. An external participant may be, for example, an externally arranged control device or a cloud. According to the development, the participant which is part of the network is preferably in the form of a control unit (for example ECU—electronic control unit) of the motor vehicle.

Particularly preferably, connections to outside the vehicle are analyzed in a particularly critical manner and are possibly assessed since external communication participants can be manipulated more easily by third parties as a result of the better accessibility and therefore facilitate an attack on the vehicle network.

In another preferred development of an aspect of the invention, the method preferably comprises, as further steps, determining interface parameters of at least one of the communication participants and/or connectivity parameters of at least one of the communication participants. Particularly preferably, the determined parameters are each stored in a database or in a common database. The at least one database may particularly preferably be stored in a central control device or central memory or in the control devices of the communication participants. According to another preferred development, the interface parameters and/or connectivity parameters are used in a further step to assess the communication paths with respect to their risk of attack.

Each communication participant preferably has one or more interfaces for transmitting data. In one preferred development of an aspect of the invention, the interface parameters comprise at least information relating to the data transmission protocols supported and/or forwarded by the interfaces. Furthermore or alternatively, provision may preferably be made for determining whether the interfaces are provided for a diagnostic function or a charging function (OBD, Powerline etc.). In the case of a charging function, the vehicle (in particular electric vehicle) can be supplied with power via the interface. Data can also be coupled in, in particular, via the interface or on the power line. Further preferably, provision is alternatively or additionally made for the interfaces to be examined with respect to their speed for transmitting data.

Each communication participant also preferably has a plurality of ways of being connected to other communication participants. In one preferred development of an aspect of the invention, the connectivity parameters comprise at least information relating to the support for connection technologies and/or distribution functionalities. The control unit can support, for example, various radio technologies, for example WLAN or Bluetooth. Whether the control unit can access a plurality of buses is part of the distribution functionality parameter. It is likewise determined whether access to switches, bridges, routers and/or gateways is possible.

The parameters are preferably stored in a database, wherein information relating to the MAC address and/or IP address of the control unit and the further devices directly connected to the control unit is also particularly preferably stored.

According to the previously mentioned method, a state analysis is therefore advantageously first of all carried out by determining which communication participants are present and which properties they bring with them. This state analysis is then subjected to a risk assessment in order to discover gaps for possible attacks. The risk potential of a communication path can be advantageously accurately analyzed by collecting or determining parameters given in the network.

In one preferred development of an aspect of the invention, parameters are likewise determined for assessing the risk of attack of the data transmission protocols and are stored in a database. In this case, the protocol stacks, in particular, are particularly preferably analyzed.

In one preferred development of an aspect of the invention, the determined parameters of the data transmission protocols relate at least to the frequency used for the data protocol, the suitability for communicating with a particular number of receivers and/or the type of transmission.

In this case, the type of transmission relates, for example, to the transmission direction, the synchronization or non-synchronization, the position of the communication participants and/or the connection orientation. In the case of a connection orientation, the start and end of a connection are defined by special packet sequences. Parameters of the data transmission protocols can also include whether packet-switched communication or streaming is involved.

In one preferred development of an aspect of the invention, the communication paths and data transmission protocols are assigned to risk classes using the respective associated assessments. The process of deciding for or against the transmission of data using a communication path and a data transmission protocol is therefore made easier. In other words, a decision regarding which communication path and which data transmission protocol are intended to be used for communication can therefore be made in a simpler manner.

In one preferred development of an aspect of the invention, information relating to different attack scenarios is used to assess the risk of attack of the communication paths. This information is preferably likewise stored in a database which is stored, in particular, in a memory and is not continuously updated. However, the information relating to the attack scenarios can alternatively also be regularly updated so that newer attack scenarios can also be taken into account. The updating can be carried out, for example, using updates from an external data connection in which the information is compared. The information particularly preferably relates to different possible types of attack and an assessment of the security risk for the automobile or the occupants. One possible type of attack is, for example, DoS (Denial of Service) in which an overload is caused by a third party and results in the failure of a function or a service. The assessment of the communication path can therefore be advantageously tailored to one or more attack scenarios which statistically occur most often, for example. Alternatively or additionally, the information relating to the different attack scenarios can also be used to assess the data transmission protocols.

As a result of the procedure described above, a detailed analysis is advantageously carried out or detailed information is stored in order to be able to assess the risk of attack of the network as accurately as possible.

In another preferred development of an aspect of the invention, before selecting a suitable communication path and the suitable data transmission protocol, it is possible to determine whether communication can actually take place or whether it should be prevented as a result of excessively high security risks. In addition, other measures, namely a special configuration of the firewall for example, can also be taken in response to one or more of the assessments.

The method according to an aspect of the invention is preferably carried out once at the end of the belt (after the production of the automobile has been completed), after a software update, after the communication of security gaps or when replacing or updating a participant of the communication path. Security gaps can therefore also be advantageously detected after delivery to the end customer, for example if control devices are replaced or if a software update has been provided. Therefore, the end customer also provides increased security with respect to attacks during operation of the vehicle.

In one preferred development, the risk of the communication paths being attacked is assessed by means of an algorithm. The algorithm can preferably also create risk classes on the basis of the risk of attack and can assign the communication paths to the risk classes. For this purpose, the algorithm concomitantly includes, in particular, one or more databases relating to the parameters of the communication paths, the data transmission protocols and/or the information relating to different attack scenarios in the evaluation.

If a particular communication path has been selected, provided or specified for transmitting data, a data transmission protocol which provides a high degree of security with respect to attacks can be selected for communication, for example, by assessing the risk of attack. This selection is also possible the other way round. If a data transmission protocol has been selected, specified or provided, the path which provides a high degree of security with respect to attacks can be selected on the basis of the assessment of the communication paths. Furthermore, that constellation which entails the lowest security risk in the interaction between the communication path and the data transmission protocol can be selected from a plurality of possible communication paths and data transmission protocols.

In one preferred development of an aspect of the invention, at least one of the databases, particularly preferably all databases or data used for the assessment, is/are stored in a secure memory area. In particular, this secure memory area is provided with encryption and is therefore protected against attacks. In this case, the secure memory area can be arranged in a central control device, for example.

An aspect of the invention also relates to an electronic monitoring unit or control unit for a motor vehicle control device, which is designed to carry out the method.

BRIEF DESCRIPTION OF THE DRAWINGS

Further preferred embodiments emerge from the following description of exemplary embodiments on the basis of figures.

In a schematic representation:

FIG. 6 shows an exemplary configuration of the method according to the invention, in which a determination of parameters for data transmission protocols is illustrated, FIG. 7 shows an exemplary risk assessment of the protocols.

In order to enable a short and simple description of the exemplary embodiments, identical elements are provided with the same reference signs.

DETAILED DESCRIPTION OF THE PREFERRED EMBODIMENTS

Figure 1:
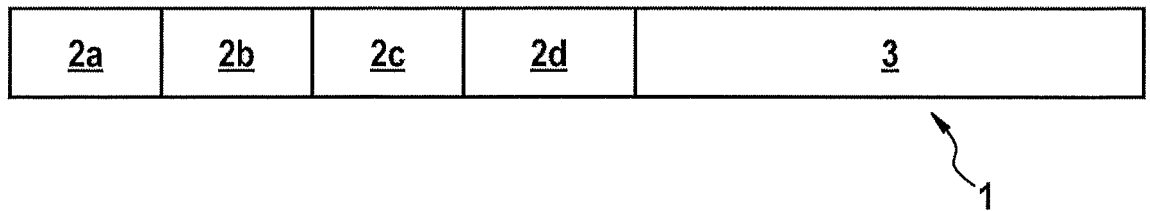
FIG. 1 shows the structure of a communication packet or stack.

FIG. 1 shows the generally known structure of a communication packet or stack 1. The challenges with the advent of Ethernet and IP (Internet Protocol) are, inter alia, the complexity of the new communication stacks. The initial fusion of the Internet world with AUTOSAR requires a lot of initial outlay since both worlds function in an entirely different manner (for example static versus dynamic).

FIG. 1 illustrates a typical communication packet. A communication stack proceeds gradually upon receiving the packet and examines the packet according to particular predefined filters in order to forward it to the correct receiver (for example an application).

Figure 2:
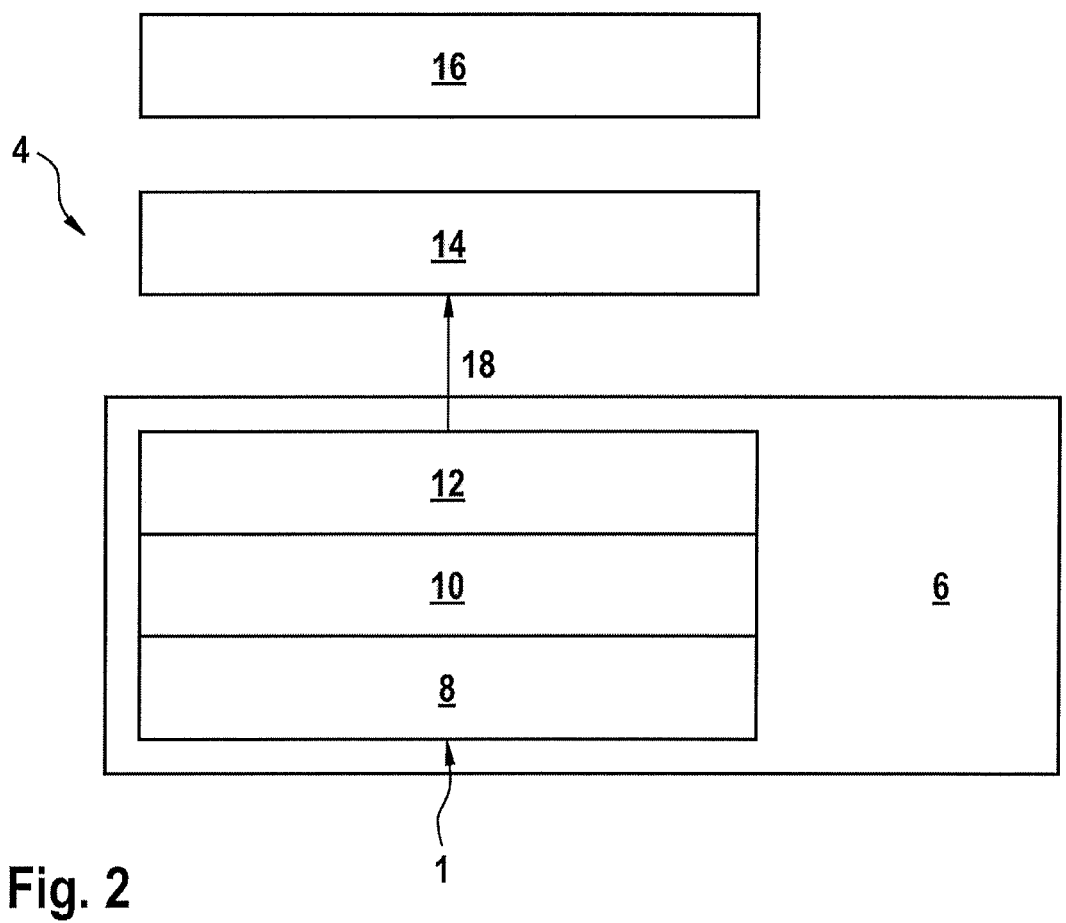
FIG. 2 shows an exemplary representation of a software stack.

The communication packet comprises the actual data content 3 and, by way of example, a plurality of headers 2a-d which are assigned to different layers of the software stack (see FIG. 2). A header is provided for each layer of the software stack and provides the layer of the software stack with information needed to process the communication packet.

FIG. 2 shows an exemplary representation of a software stack 4 in a control device. A TCP/IP stack 6 is illustrated by way of example. A communication packet (for example as shown in FIG. 1) runs through this stack, wherein the packet is analyzed. It is determined, on the basis of the analysis of the content, to which application the communication packet is forwarded.

The TCP/IP stack 6 illustrated comprises a plurality of layers, here represented as reference signs 8, 10 and 12, wherein layer 8 is in the form of MAC (Media Access Control), layer 10 is in the form of IP (Internet Protocol) and layer 12 is in the form of TCP/UDP (Transmission Control Protocol/User Datagram Protocol). The headers of the communication packet (see FIG. 1) are each assigned to one of these layers.

The MAC layer 8 is representative of layers one (physical layer) (for example with header 2a in FIG. 1) and two (data link layer) (for example with header 2b in FIG. 1) according to the generally known OSI model, IP is representative of the third layer (for example with header 2c in FIG. 1) of the OSI model, and TCP/UDP is representative of the fourth layer (for example with header 2d in FIG. 1) of the OSI model. The "Middleware" layer is represented in layer 14, which corresponds to layers five and six of the OSI model (session and presentation). An application ("application" layer) is above this as the seventh layer 16.

Ethernet frames, that is to say the data packets 1, are transmitted to the TCP/IP stack 6. The data and management information 18 of a layer (PDUs=Payload Data Units) can be transmitted, for example, from the TCP/IP stack 6 to the "middleware layer" 14.

Figure 3:
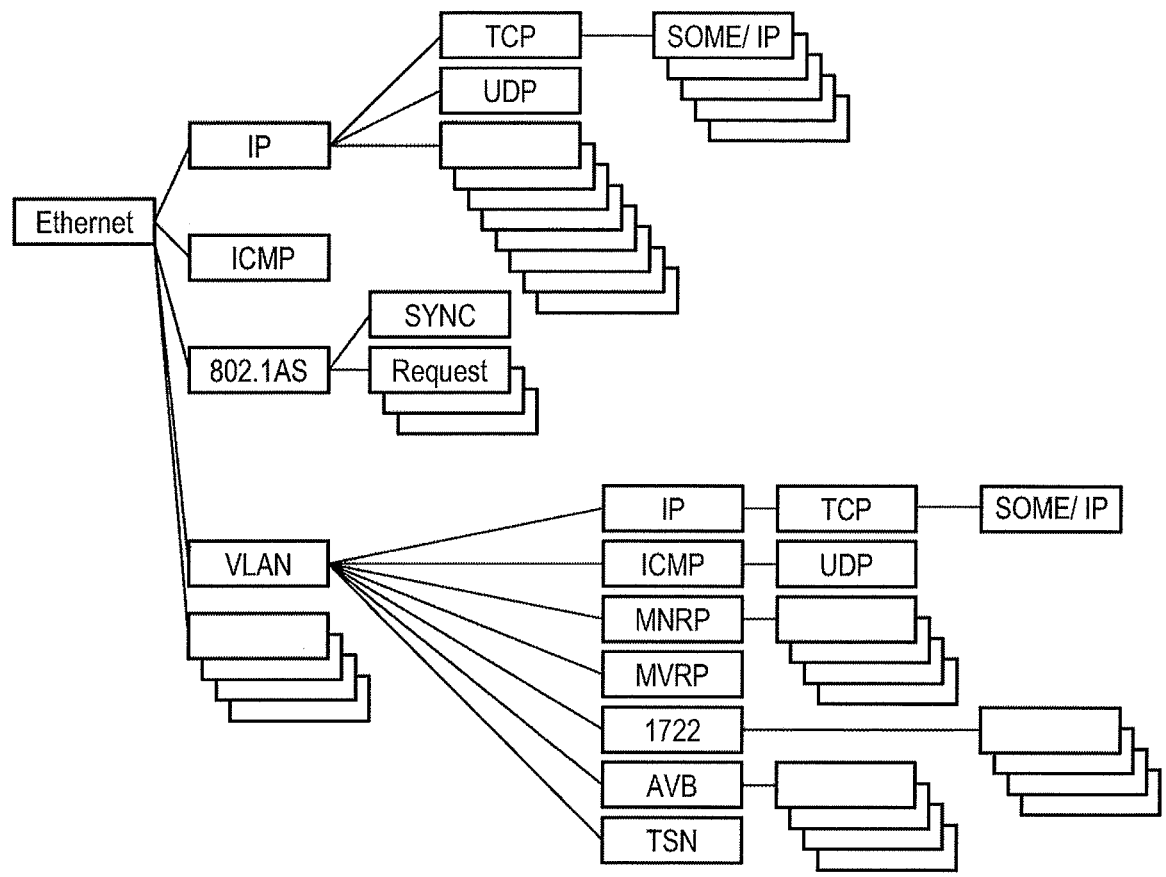
FIG. 3 shows an exemplary example of a complex Ethernet/IP communication stack and its branches.

FIG. 3 shows an exemplary example, of a complex Ethernet/IP communication stack and its branches. It becomes clear that there are various possibilities for the content of an Ethernet packet which must be processed in such a software stack. The complexity of the software stacks increases very greatly in automobiles with the advent of Ethernet and IP. The traceability for a deterministic software stack is no longer so simple, in particular as a result of the various branching possibilities.

Figure 4:
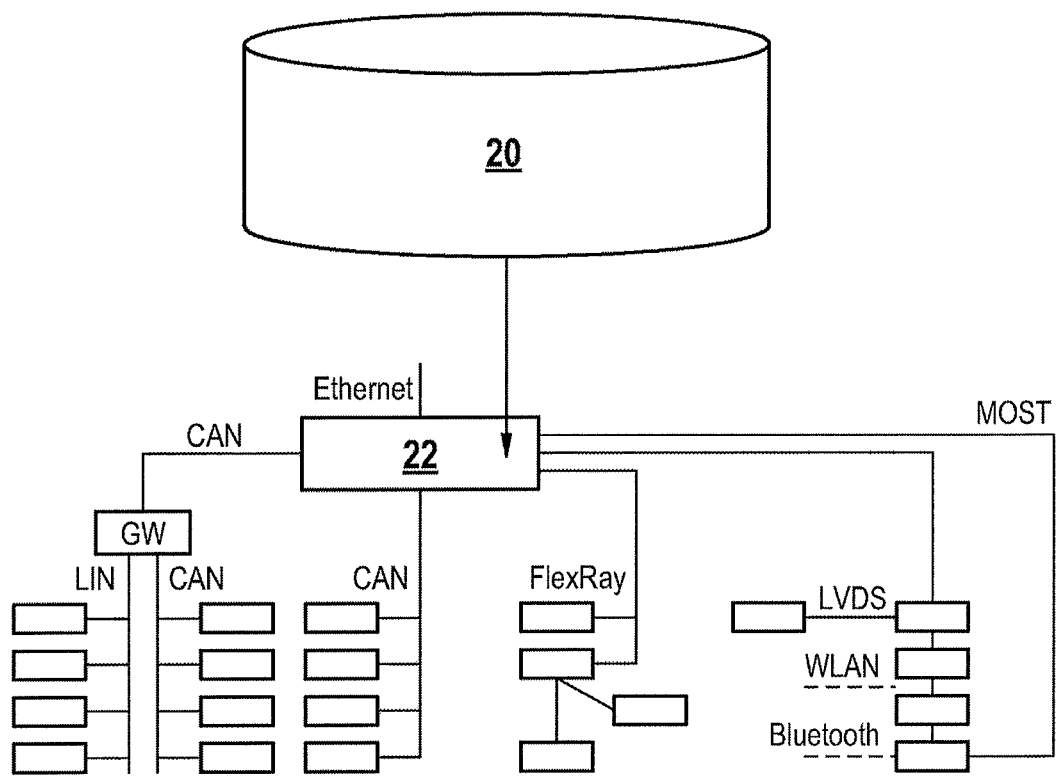
FIG. 4 shows an exemplary embodiment of the invention.

FIG. 4 shows an exemplary embodiment of the invention in which a database 20 is stored in a central gateway 22, or the central gateway 22 has access to this database 20. The database 20 contains information which is determined by the method according to the invention. Branching off from the central gateway 22 are further gateways (GW) and control devices or possible communication partners (depicted as small boxes) which are connected to one another via CAN (Control Area Network), LIN (Local Interconnect Network), FlexRay, MOST (Media Oriented Systems Transport), WLAN (Wireless Local Area Network), LVDS (Low Voltage Differential Signaling), Bluetooth or Ethernet.

All of these different possible connections are taken into account in the method according to the invention, wherein risk assessments for the individual connection possibilities are stored at least in a database (for example 20). In this case, the risk assessments indicate the risk of third parties gaining access to data and/or control of control/regulation mechanisms in the vehicle via the connection. The information in this database 20 is used, for example by an algorithm, to assign communication paths and data transmission protocols to risk classes. The risk classes are taken as a basis for selecting which communication path in combination with which data transmission protocol is intended to carry out communication or data transmission between a plurality of participants. In this case, a combination of a communication path and a data transmission protocol, which have a relatively low security risk or for which a relatively low risk of attack has been determined, is preferably selected.

Figure 5:
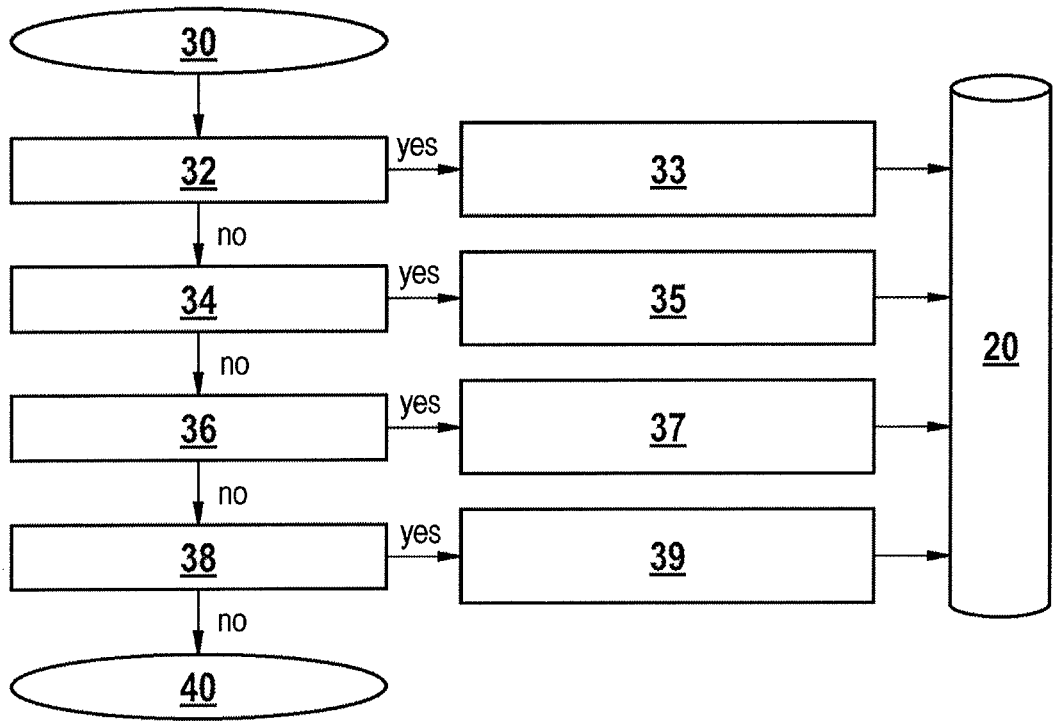
FIG. 5 shows an exemplary configuration of the method according to the invention, in which a determination of connectivity parameters and interface parameters of a control device is illustrated.

FIG. 5 shows an exemplary embodiment of the invention for determining connectivity parameters and interface parameters of a control unit.

Explanation of the Individual Steps

30: Start of the query of the control devices with regard to connectivity and interfaces 32: Does the ECU support radio technologies, for example WLAN, Bluetooth?

33: Request for MAC address and IP address of this device, including the addresses of the directly connected control devices 34: Does the ECU have interfaces which are provided for diagnosis or charging (OBD, Powerline etc.)?

35: Request for the MAC address and IP address of this device, including the addresses of the directly connected control devices, and the power status 36: Does the ECU have a distribution functionality (switch, router, gateway)?

37: Request for the IP address of this device and the port statuses and speeds

38: Does the ECU have fast interfaces such as 100BaseT1 or comparable or faster?

39: Query with respect to policing and rate-limiting functions

40: End

For example, it is possible to query whether the control unit (ECU) supports radio connections, for example WLAN or Bluetooth (reference sign 32). If so, the MAC address and/or the IP address of the device is/are determined 33 and stored in a database 20. The addresses (MAC and IP) of the devices connected to the control unit are likewise preferably stored in the database 20. It is also possible to query, for example, whether the control unit has interfaces which are suitable 34 for diagnosis or charging (OBD—On Board Diagnosis, PLC—Powerline Communication, etc.). In this case too, the addresses can be stored again as well as the power status (if an interface for Powerline Communication is present) 35. In this case, the power status may be the manner in which the interface is supplied with power, that is to say from an external battery or from an internal battery, for example.

A further exemplary query may relate 36 to the distribution functionality of the control unit. If the control unit has a distribution functionality, it can access different buses and can therefore reach different communication participants (for example switch, router, gateway). In addition to storing IP addresses of this control unit and of the communication participants which can be connected, the respective status of the ports and the possible speeds are also preferably stored 37 here in the database 20. The energy states such as "off", "on", "energy-saving mode", "wakeable" etc. can be provided as the status of the ports.

As a further query, provision may be made, for example, to determine the speed of the interfaces, in particular whether or not a fast interface, for example 100BASE-T1, is present 38. Information relating to monitoring (policing) and rate-limiting functions is preferably used in this respect. Within the scope of a rate-limiting function, a data rate is set based on a unit of time. During so-called policing, monitoring is then carried out in order to ensure that the maximum data rate per unit of time is not exceeded. If an exceedance occurs, for example if more data are transmitted than set, said data are rejected, for example. The information or settings for said functions can be captured 39 as parameters for the interfaces and can be stored in a database 20.

The individual query steps can be run through in a programming loop in this case and can be part of an algorithm which is stored, for example, on a central control device, for example gateway 22, and preferably in a secure memory area. The databases 20 are preferably also stored in this memory area or in another secure memory area.

The control devices present in a network of a vehicle are preferably classified in risk classes by means of the above-mentioned method on the basis of their connectivity in order to store important parameters, on the basis of which the assignment to security mechanisms will take place. In this case, these ECUs are either equipped with radio technologies or with open network interfaces with which contact can be made.

A check with respect to the protocol support can then take place, for example. This can be carried out once (belt end), before pending connections to the outside, after a software update or with notification of security gaps in existing protocols. In this case, the method can be centrally initiated or can be requested by individual ECUs. If, for example, the set-up of a communication path is pending and if diagnostic data, for example, are intended to be transmitted from an antenna module by radio, the antenna module can check the respective neighboring devices for their protocol support.

FIG. 6 shows, by way of example, part of the method according to the invention and the individual steps or procedure steps of the algorithm contained therein. The individual steps are:

50: Start of the examination for protocol implementations

Each control device 51 examines each interface 52 in order to determine whether particular protocol types 53 are supported 54 and/or are forwarded 55.

Step 54: It is determined whether the interface supports the protocol.

Step 55: It is determined whether the interface forwards the protocol.

Step 56: Storage of information in a database 20, wherein the information relates, for example, to the ECU, the interface and the protocol type.

57: End of the program run

Some comments are cited in FIG. 6 in addition to the reference signs since they represent a program run which can be better understood by means of the comments.

It is therefore determined, for each ECU and for each interface of the ECUs, whether different protocol types are supported 51-54. The protocol types are preferably each individually queried 53 by the algorithm. The results are stored in a database 20. In this case, the result is preferably a table with the designation of the ECU and the interface and whether the respective protocol type is supported. For example, a results table of this type, as shown in FIG. 7, could be created. The matrix shown in FIG. 7 reflects the actual implementation and not the specification. This makes it possible to identify faults in the implementation or else gaps. The matrix can additionally serve the TÜV or system manufacturer, for example, for verifying and testing a vehicle in terms of security—irrespective of mechanisms resulting therefrom and even before the vehicle is delivered to the end customer.

Figure 8:
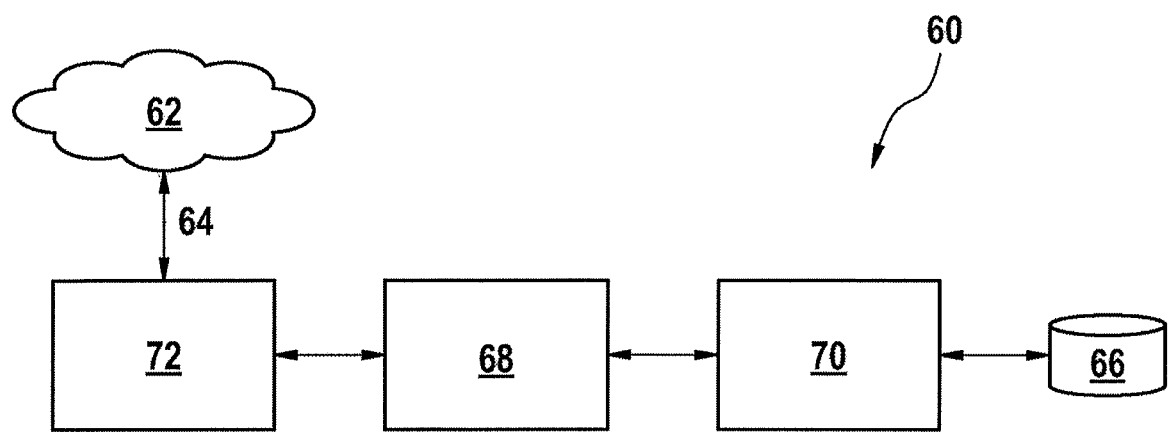
FIG. 8 shows an exemplary path of a critical path in the vehicle with a connection to a cloud or other external units.

FIG. 8 shows, for example, a critical path 60 which in this case consists of an external connection (for example radio connection to a cloud) 62. External connections are preferably classified or assessed as more critical than exclusively internal connections from the outset in the parameter analysis. For example, a data transmission in the form of a software download 64 is intended to be initiated, in which case the software is intended to be downloaded from the cloud 62. For this purpose, an internal memory 66 is connected, for example, to a gateway 68 (may be identical to 22) via a head unit 70 and the gateway 68 is connected to the cloud 62 via a WLAN connection module 72. According to the example, this chain of communication partners 62-72 therefore represents the communication path 60. This path 60 is assessed with respect to its risk of attack, that is to say how high the risk is of becoming the victim of an attack by third parties which could possibly endanger the safety in the vehicle. For this purpose, the individual communication participants 62-72 are examined with respect to their connectivity parameters and their interface parameters. At the same time, the risk of the individual possible data transmission protocols is preferably included in the assessment. If this path 60 is intended to be selected for communication and it emerges that the intended protocol is too insecure when the risk of the path 60 being attacked is considered, a different protocol can be selected for transmitting the data, for example. Alternatively, other, more secure paths can also be selected for communication. This path 60 shown by way of example in FIG. 8 can be specified by the system designer or architect and as such may also be defined or dynamically determined.

Furthermore, after checking the matrix (FIG. 7), the path 60 can also be additionally checked for its gaps. The situation may occur in which a non-critical path nevertheless becomes critical. For example, as a result of an abnormal behavior of a control device, its data may be forwarded to a CPU, as a result of which another control device is blocked and comes to a standstill.

Example of Communication Path and Parameters

Involved Control Devices:
  Antenna, gateway (including switch), head unit
Protocols:
  Ethernet, VLAN, time synchronization, IP, TCP, SOME/IP
Message frequency:
  x/packets per second Ethernet, x/packets per second TCP, etc., max. packet size A data stream which is considered to be secure may become a risk if, instead of 10 data packets per second, 1000 data packets are suddenly intended to be processed by a central computing unit. The CPU (possibly also a plurality) is therefore important since incoming data packets are always processed (accepted and stored) with a high priority. If too many packets arrive at an excessively high frequency and with an excessive packet size, the CPU can be blocked and the control device can therefore fail entirely.

If a communication path is fixed, for example that in FIG. 8, the involved control devices 62-72 can be queried with respect to their risk class and their protocol support. Gaps and/or risks can therefore be immediately detected with the aid of the protocols required for communication. For example, the TCP data traffic is forwarded to the CPU in the head unit 70 in this connection. This information is present in the risk assessment. Even before the actual connection is set up, the TCP traffic can be limited in the head unit 70 or even earlier (in the gateway 68), that is to say a maximum packet data rate per second can be stipulated.

Furthermore, a firewall in the head unit 70 can be configured on the basis of the communication parameters and the (already) detected gaps. This means that the filters of the firewall are adjusted to this communication and a higher priority is placed thereon.

Figure 9:
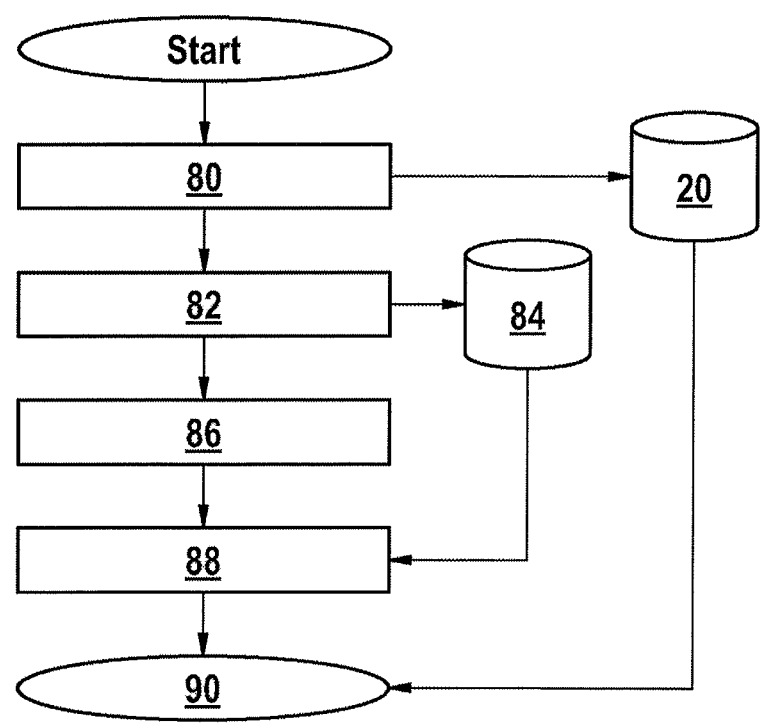
FIG. 9 shows an exemplary embodiment of the method according to the invention for protecting a communication path.

FIG. 9 shows a possible overall view of the method according to the invention. At the start of the method, the individual communication participants are therefore preferably first of all queried 80 with respect to their interfaces and their connectivity parameters. The results are stored in a database 20. Furthermore, for example as the next step, the supported data transmission protocols are queried 82 and are likewise stored in a database. In this case, the risk of the respective data transmission protocols being attacked is also stored. Since various types of data transmission protocols are generally already known, the respectively present risks of attack can also already be stored as information in a database, which information is then used when determining the supported protocols. The risk of the data transmission protocols being attacked is then assessed on the basis of the stored information.

Overall, a risk matrix 84 (as shown in FIG. 7) may be produced. The path is then assessed 86 with respect to its risk of attack. This can be carried out by means of an algorithm. That protocol which has a relatively low security risk (risk of an attack on the network) can then be selected 88 from the supported data transmission protocols for communication.

On the basis of the classifications, the level of the possible security resources can also be determined and allocated 90, as a result of which the information security in the network can be planned and implemented during the design phase, during the end-of-belt programming or in the case of a dynamic and disruptive architecture.

Overview of the Steps

80: Determination of the connectivity parameters and interface parameters of the communication participants
82: Determination of which protocols are supported
84: Creation of a risk matrix
86: Calculation/query of the critical path
88: Analysis of the required protocols/selection of a suitable data transmission protocol
90: Definition of the security methods The databases 20 and/or the assessment algorithm is/are particularly preferably stored both centrally and in each individual control device. A so-called risk assessment is produced on the basis of the supported and unsupported protocols and the processing thereof. This risk assessment can then be used to analyze and protect a communication path. This matrix is queried during the creation of a communication path and actions are defined if necessary. The resulting matrix reflects the actual implementation and not the specification. This makes it possible to identify faults in the implementation or else security gaps. Irrespective of mechanisms resulting therefrom, the matrix can additionally be used to verify and check a vehicle with respect to information security.

After having knowledge of the protocol support, an ECU, for example, can change its protocol choice since there are problems on a path. More secure protocols, for example, can be selected here.

In the present figures, the databases are provided with the reference sign 20. However, the individual determined parameters and risks of attack may likewise be stored in separate databases. In this case, a database is then respectively available for the interface parameters, for the connectivity parameters, for the risk of the communication paths or communication participants being attacked, for the risk of the data transmission protocols being attacked and for the risk classes.

The invention defines mechanisms for selecting the correct software branches for potential attack functions. The invention states which packets can be used for which type of application and which cannot be used.

The invention can be used during end-of-belt programming and in system testing. Furthermore, more and more software updates will be offered for automobiles in future, as a result of which new functions are enabled. As a result of the wide variety, the invention is suitable for checking and newly assessing the software stacks in the vehicle after an update in their entirety and partially. The invention proposes a method which configures these regulation mechanisms and possibilities in the network and renders them usable via an interface. It is therefore possible to discern which potential gaps exist and whether the software meets predefined requirements. This method also makes it possible to provide transparency and therefore to check and test the entire network with regard to security in a much simpler manner.

The invention claimed is:

1. A method for a communication network in a motor vehicle, the method comprising:
    assessing, by a controller of the motor vehicle, communication paths which are possible for transmitting data between the controller, internal devices within the motor vehicle and external devices outside of the motor vehicle, the assessment including:
        determining, by the controller, each of the communication paths between the controller and the internal devices, and between the controller and the external devices,
        determining, by the controller, communication protocols supported by each of the internal devices and the external devices,
        determining, by the controller, a risk of attack by a third party device for each of the communication paths and for each of the communication protocols,
    selecting, by the controller, a combination of a selected communication path of the communication paths and a selected communication protocol of the communication protocols, based on the risk of attack, and
    controlling, by the controller, the motor vehicle by communicating with at least one of the internal devices or at least one of the external devices via the selected combination of selected communication path and the selected communication protocol.

2. The method as claimed in claim 1, wherein each of the communication paths comprises a plurality of internal devices and external devices,
    wherein the method further comprises:
        determining interface parameters of the internal devices and external devices,
        storing the interface parameters in a database, and
        using the interface parameters to assess the communication paths.

3. The method as claimed in claim 1, wherein each communication path comprises a plurality of internal devices and external devices,
    wherein the method further comprises:
        determining connectivity parameters of the internal devices and external devices,
        storing the connectivity parameters in a database, and
        using the determined connectivity parameters to assess the communication paths.

4. The method as claimed in claim 1, further comprising:
    assigning the communication paths and data communication protocols to risk classes using the respective associated assessment of the risk of attack.

5. The method as claimed in claim 1, wherein information relating to different attack scenarios is used to assess the risk of attack of the communication paths and/or of the data communication protocols.

6. The method as claimed in claim 1, wherein the method is carried out once after manufacturing the motor vehicle, after a software update, after the communication of security gaps or when replacing or updating at least one of the internal devices or the external devices of the communication paths.

7. An electronic control unit for controlling a communication network in a motor vehicle, the controller comprising:
 a processor configured to:
  assess communication paths which are possible for transmitting data between the controller, internal devices within the motor vehicle and external devices outside of the motor vehicle, the assessment including:
  determining each of the communication paths between the controller and the internal devices, and between the controller and the external devices,
  determining communication protocols supported by each of internal devices and the external devices,
  determining a risk of attack by a third party device for each of the communication paths and for each of the communication protocols,
  selecting a combination of a selected communication path of the communication paths and a selected communication protocol of the communication protocols, based on the risk of attack, and
  controlling the motor vehicle by communicating with at least one of the internal devices or at least one of the external devices via the selected combination of selected communication path and the selected communication protocol.

* * * * *